Patented Oct. 31, 1950

2,528,139

UNITED STATES PATENT OFFICE 2,528,139

INSECTICIDES

Walter D. Harris, Naugatuck, and Theodore W. Kerr, Seymour, Conn., assignors to United States Rubber Company, New York, N. Y., a corporation of New Jersey No Drawing. Application April 25, 1946,
Serial No. 664,988

17 Claims. (Cl. 167—31)

This invention relates to improvements in insecticides. The term "insecticide" is considered to include larvaecides, arachnicides, and insect repellents or insectifuges, and is to be construed in accordance with the Insecticide Act of 1910, Section 6.

We have found that mixed aliphatic-aromatic acetals of chloral are effective insecticides. These are new chemicals which we have found to be toxic to a wide variety of insects, including the greenhouse red spider mite and the Mexican bean beetle, which insects are not effectively controlled by the known insecticide 2,2-bis(p-chlorophenyl)-1,1,1-trichloroethane (DDT). The mixed aliphatic-aromatic acetals of chloral may be represented by the general formula

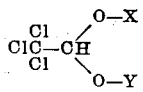

in which X is an aliphatic radical and Y is an aromatic radical. Examples of the aliphatic radicals X are alkyl, cycloalkyl, haloalkyl, cyanoalkyl, alkoxyalkyl, hydroxyalkyl. Examples of the aromatic radicals Y are phenyl, naphthyl, halophenyl, nitrophenyl, alkylphenyl, alkoxyphenyl. The chemicals of the invention may also be classed as 1-alkoxy-1-aryloxy - 2,2,2 - trichloroethanes, where the alkoxy group may be considered a hydrocarbon alkyl ether linkage or a substituted alkyl ether linkage (e. g. haloalkyl, cyanoalkyl, alkoxyalkyl or hydroxyalkyl ether linkage) and the aryloxy group may be considered a hydrocarbon aryl (e. g. phenyl or naphthyl) ether linkage, or a substituted aryl·ether linkage (e. g. haloaryl, nitroaryl, alkaryl; or alkoxyaryl ether linkage).

The compounds of the present invention are readily prepared by refluxing the selected phenolic compound with the selected $\alpha,\beta,\beta,\beta$-tetrachloroethyl aliphatic ether. The $\alpha,\beta,\beta,\beta$-tetrachloroethyl aliphatic ethers are known and described in the literature. The reaction between the phenol and the chloroether proceeds smoothly and in good yields. No catalyst is necessary. In general, it is advisable to use an excess of the lower boiling component, so that the temperature may be controlled more readily. The mixture is refluxed, preferably under reduced pressure, from one to five hours. The reaction mixture can then be fractionated without washing, or if extreme purity is desired, unreacted phenol can be removed by washing with dilute aqueous alkali before distilling. Most of these materials are colorless, almost odorless liquids.

The chemicals of the present invention may be applied to loci to be protected against insects in undiluted form, or as dusts when admixed with or adsorbed on powdered solid inert carriers, such as clay or talc, or as liquids or sprays when in a liquid carrier, as in solution in a suitable solvent, or dispersed in a suitable non-solvent medium, for example, water. In protecting plants (the term including plant parts) which are subject to attack by insects, the mixed aliphatic-aromatic acetals of chloral of the present invention are preferably applied as aqueous emulsions containing a dispersing agent. The chemicals may be used admixed with carriers that are active of themselves, for example, other insecticides, fungicides or bactericides.

Detailed procedures for the preparation of various compounds of the present invention are described in Examples I to XVII given below.

EXAMPLE I

*1-ethoxy-1-phenoxy-2,2,2-trichloroethane*

A solution of 100 g. of phenol and 19 g. of $\alpha,\beta,\beta,\beta$-tetrachloroethyl ethyl ether was refluxed at atmospheric pressure for two hours. The dark colored reaction product was poured into 1500 cc. of ice water. The mixture was stirred for a few minutes, then was made basic by adding an excess of aqueous sodium hydroxide. The oil layer was separated and the water layer was extracted with 300 cc. of ether. The ether extract was added to the oil and the combined solution was washed with water. The ether solution was dried over calcium chloride, concentrated on the steam bath and finally distilled under reduced pressure. The fraction boiling at 130–131° C./4 mm. was a clear, light yellow, almost odorless liquid. Analysis calculated for $C_{10}H_{11}O_2Cl_3$: 39.46% Cl; found 39.25% Cl.

The equation for the reaction is:

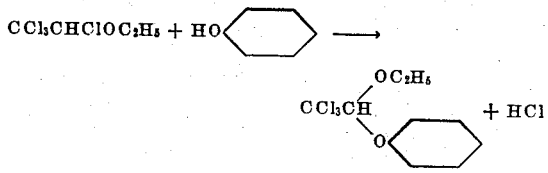

EXAMPLE II

*1-ethoxy-1-(2,4-dichlorophenoxy)-2,2,2-trichloroethane*

A solution of 20 g. of 2,4-dichlorophenol in 40 g. of $\alpha,\beta,\beta,\beta$-tetrachloroethyl ethyl ether was heated under reflux for three hours. The temperature climbed gradually to about 216° C. Hydrogen chloride was evolved rapidly during the first part of the reaction period. The oil layer was washed with dilute aqueous sodium hydroxide, then with water. Finally, it was distilled under reduced pressure. A yield of 29 g. (70% of theoretical) of water-white oil boiling at 134–138° C./2 mm. was obtained. Analysis calculated for $C_{10}H_9O_2Cl_5$: 52.38% Cl; found 51.72% Cl.

EXAMPLE III

*1-ethoxy-1-(2,4,6-trichlorophenoxy)-2,2,2-trichloroethane*

This compound was prepared by reacting 2,4,6-trichlorophenol with $\alpha,\beta,\beta,\beta$-tetrachloroethyl ethyl ether according to the method of Example II. Boiling point 145–150° C./1 mm.

EXAMPLE IV

*1-β-chloroethoxy-1-(2,4-dichlorophenoxy)-2,2,2-trichloroethane*

This compound was prepared by reacting 2,4-dichlorophenol with $\alpha,\beta,\beta,\beta$-tetrachloroethyl β-chloroethyl ether according to the method of Example II. Boiling point 170–172° C./2 mm. Refractive index, $n_D^{20}$ 1.5580. Analysis calculated for $C_{10}H_8O_2Cl_6$: 57.05% Cl; found 56.41% Cl.

EXAMPLE V

*1-ethoxy-1-(p-chlorophenoxy)-2,2,2-trichloroethane*

A solution of 70 g. of $\alpha,\beta,\beta,\beta$-tetrachloroethyl ethyl ether and 25.7 g. of p-chlorophenol was refluxed at atmospheric pressure for about 1½ hours. During this time hydrogen chloride was evolved rapidly and the solution took on a reddish brown color. Refluxing was continued under reduced pressure (about 100 mm.) for two hours. In this way the temperature of the reaction mixture was maintained near 150° C. No further darkening was noted during this period. The reaction mixture was washed with dilute aqueous alkali to remove the unchanged p-chlorophenol, then with water. The oil layer was separated and fractioned under reduced pressure. A fore-run consisting mostly of unreacted tetrachloroethyl ether weighed 20 g. The main fraction boiled at 120–122° C./1.1 mm. A yield of 60.8 g. (87% of theoretical) of almost water-white oil was obtained. It had a slight not unpleasant odor. Analysis calculated for $C_{10}H_{10}O_2Cl_4$: 46.65% Cl; found 46.28% Cl.

EXAMPLE VI

*1-ethoxy-1-(2,4,5-trichlorophenoxy)-2,2,2-trichloroethane*

This compound was prepared by reacting $\alpha,\beta,\beta,\beta$-tetrachloroethyl ethyl ether with 2,4,5-trichlorophenol according to the method of Example V. Boiling point 157° C./1.5 mm. Refractive index, $n_D^{20}$ 1.5557. Analysis calculated for $C_{10}H_8O_2Cl_6$: 57.05% Cl; found 56.5% Cl.

EXAMPLE VII

*1-β-chloroethoxy-1-phenoxy-2,2,2-trichloroethane*

This compound was prepared by reacting $\alpha,\beta,\beta,\beta$-tetrachloroethyl β-chloroethyl ether with phenol, according to the method of Example V. Boiling point 129° C./1.7 mm. Refractive index, $n_D^{20}$ 1.5397. Analysis calculated for $C_{10}H_{10}O_2Cl_4$: 46.65% Cl; found 46.14% Cl.

EXAMPLE VIII

*1-β-chloroethoxy-1-(2-naphthoxy)-2,2,2-trichloroethane*

This compound was prepared by reacting $\alpha,\beta,\beta,\beta$-tetrachloroethyl β-chloroethyl ether with 2-naphthol, according to the method of Example V. Boiling point 172–190° C./0.3 mm.

EXAMPLE IX

*1-β-chloroethoxy-1-(p-chlorophenoxy)-2,2,2-trichloroethane*

This compound was prepared by reacting $\alpha,\beta,\beta,\beta$-tetrachloroethyl β-chloroethyl ether with p-chlorophenol, according to the method of Example V. Boiling point 157° C./2 mm. Refractive index, $n_D^{20}$ 1.5488. Analysis calculated for $C_{10}H_9O_2Cl_5$: 52.38% Cl; found 51.99% Cl.

EXAMPLE X

*1-ethoxy-1-(o-chlorophenoxy)-2,2,2-trichloroethane*

A solution of 19.2 g. of o-chlorophenol and 45 g. of $\alpha,\beta,\beta,\beta$-tetrachloroethyl ethyl ether was refluxed for five hours under reduced pressure. The reaction mixture was fractionated under reduced pressure. A fore-run, consisting of unchanged starting materials and weighing 17.5 g. was obtained. The product (34 g.) was collected at 136–137° C./2 mm. It was a colorless, mobile liquid. Analysis calculated for $C_{10}H_{10}O_2Cl_4$: 46.65% Cl; found 46.23% Cl.

EXAMPLE XI

*1-ethoxy-1-(m-chlorophenoxy)-2,2,2-trichloroethane*

This compound was prepared by reacting m-chlorophenol with $\alpha,\beta,\beta,\beta$-tetrachloroethyl ethyl ether according to the method of Example X. Boiling point 136–137° C./2 mm. Analysis calculated for $C_{10}H_{10}O_2Cl_4$: 46.65% Cl; found 46.68% Cl.

EXAMPLE XII

*1-ethoxy-1-(p-nitrophenoxy)-2,2,2-trichloroethane*

This compound was prepared by reacting p-nitrophenol with $\alpha,\beta,\beta,\beta$-tetrachloroethyl ethyl ether according to the method of Example X. The compound was a light yellow solid having a melting point of 67–69° C. Analysis calculated for $C_{10}H_{10}O_4NCl_3$: 33.82% Cl; found 32.28% Cl.

EXAMPLE XIII

*1-ethoxy-1-(p-methylphenoxy)-2,2,2-trichloroethane*

This compound was prepared by reacting p-methylphenol with $\alpha,\beta,\beta,\beta$-tetrachloroethyl ethyl ether according to the method of Example X. Boiling point 100° C./0.7 mm.

EXAMPLE XIV

*1-ethoxy-1-(p-ethoxyphenoxy)-2,2,2-trichloroethane*

This compound was prepared by reacting p-ethoxy phenol with $\alpha,\beta,\beta,\beta$-tetrachloroethyl ethyl ether, according to the method of Example X. Boiling point 130–135° C/1.2 mm. Refractive index, $n_D^{20}$ 1.5216.

EXAMPLE XV

1-butoxy-1-(p-chlorophenoxy)-2,2,2-trichloroethane

This compound was prepared by reacting p-chlorophenol with $\alpha,\beta,\beta,\beta$-tetrachloroethyl butyl ether, according to the method of Example X. Boiling point 130–140° C./0.4 mm. Analysis calculated for $C_{12}H_{14}O_2Cl_4$: 42.71% Cl; found 41.97% Cl.

EXAMPLE XVI

1-hexoxy-1-(p-chlorophenoxy)-2,2,2-trichloroethane

This compound was prepared by reacting p-chlorophenol with $\alpha,\beta,\beta,\beta$-tetrachloroethyl hexyl ether, according to the method of Example X. Boiling point 140–150° C./0.4 mm. Analysis calculated for $C_{14}H_{18}O_2Cl_4$; 39.39% Cl; found 38.35% Cl.

EXAMPLE XVII

1-octoxy-1-(p-chlorophenoxy)-2,2,2-trichloroethane

This compound was prepared by reacting p-chlorophenol with $\alpha,\beta,\beta,\beta$-tetrachloroethyl octyl ether, according to the method of Example X. Boiling point 155–165° C./0.4 mm. Analysis calculated for $C_{16}H_{22}O_2Cl_4$: 36.54% Cl; found 34.27% Cl.

Examples of other aliphatic groups in the alkyl ether linkage in the general formula are: methyl, n-propyl, isopropyl, isobutyl, sec-butyl, n-amyl, isoamyl, 2-methyl butyl, heptyl, lauryl, hydroxyethyl, and ethers thereof, $\beta$-bromoethyl, $\alpha$-chloropropyl, $\beta$-cyanothyl. Examples of other aromatic groups in the aryl ether linkage in the general formula are shown in the following further compounds illustrative of the present invention:

1 - $\beta$ - cyanoethoxy-1-p-chlorophenoxy-2,2,2-trichloroethane,

1 - $\alpha$ - chloropropoxy - 1 - (2,4-5-trichlorophenoxy)-2,2,2-trichloroethane, 1 - cyclohexyloxy - 1-(p-tert.-butylphenoxy)-2,2,2-trichloroethane, 1 - isobutyloxy - 1-(p-tert.-butylphenoxy)-2,2,2-trichloroethane.

The following examples illustrate the effectiveness of various mixed aliphatic-aromatic acetals of chloral as insecticides:

Example A

Pinto bean leaves were sprayed with 1% aqueous emulsions of various mixed aliphatic-aromatic acetals of chloral, the emulsions containing a small amount of a commercial dispersing agent which was known to be non-toxic to the organisms under test. The bean leaves were then infested with approximately 40 Mexican bean beetles (Epilachna varivestis) in four replicates of each treatment. The bean leaves were placed in separate covered petri dishes. After 48 hours observations disclosed mortalities of the beetles on the leaves treated with the various mixed aliphatic-aromatic acetals of chloral, as shown in the following table. In untreated leaves there was no mortality of the beetles.

| Chemical | Per Cent Mortality |
|---|---|
| 1-Ethoxy-1-phenoxy-2,2,2-trichloroethane | 100.0 |
| 1-Ethoxy-1-(p-chlorophenoxy)-2,2,2-trichloroethane | 100.0 |
| 1-Ethoxy-1-(o-chlorophenoxy)-2,2,2-trichloroethane | 100.0 |
| 1-Ethoxy-1-(m-chlorophenoxy)-2,2,2-trichloroethane | 100.0 |
| 1-Ethoxy-1-(2,4-dichlorophenoxy)-2,2,2-trichloroethane | 100.0 |
| 1-Ethoxy-1-(2,4,6-trichlorophenoxy)-2,2,2-trichloroethane | 100.0 |
| 1-Ethoxy-1-(2,4,5-trichlorophenoxy)-2,2,2-trichloroethane | 87.5 |
| 1-Ethoxy-1-(p-nitrophenoxy)-2,2,2-trichloroethane | 85.0 |
| 1-Butoxy-1-(p-chlorophenoxy)-2,2,2-trichloroethane | 100.0 |
| 1-Hexoxy-1-(p-chlorophenoxy)-2,2,2-trichloroethane | 82.5 |
| 1-Octoxy-1-(p-chlorophenoxy)-2,2,2-trichloroethane | 55.0 |
| 1-$\beta$-chloroethoxy-1-phenoxy-2,2,2-trichloroethane | 100.0 |
| 1-$\beta$-chloroethoxy-1-(p-chlorophenoxy)-2,2,2-trichloroethane | 100.0 |
| 1-$\beta$-chloroethoxy-1-(2,4-dichlorophenoxy)-2,2,-trichloroethane | 100.0 |
| 1-$\beta$-chloroethoxy-1-(2-naphthoxy)-2,2,2-trichloroethane | 59.0 |
| 1-Ethoxy-1-(p-methylphenoxy)-2,2,2-trichloroethane | 100.0 |
| 1-Ethoxy-1-(p-ethoxyphenoxy)-2,2,2-trichloroethane | 100.0 |

Example B

Leaves of the broad bean (Vicia faba) infested with pea aphids (Macrosiphum pisi) were sprayed with 1% aqueous emulsions of various mixed aliphatic-aromatic acetals of chloral, the emulsions containing a small amount of a commercial wetting agent which was known to be non-toxic to the organisms under test. There were variable numbers of insects in four replicates of each treatment. Observations were made after 24 hours to disclose the kill of aphids. The percent mortality and the number of pea aphids on the leaves treated with the various mixed aliphatic-aromatic acetals of chloral are shown in the following table. In untreated (check) leaves infested with 361 aphids, the mortality was 1.8%.

| Chemical | No. of Aphids | Per Cent Mortality |
|---|---|---|
| 1-Ethoxy-1-phenoxy-2,2,2-trichloroethane | 211 | 96.7 |
| 1-Ethoxy-1-(p-chlorophenoxy)-2,2,2-trichloroethane | 140 | 95.0 |
| 1-Ethoxy-1-(o-chlorophenoxy)-2,2,2-trichloroethane | 233 | 90.1 |
| 1-Ethoxy-1-(m-chlorophenoxy)-2,2,2-trichloroethane | 211 | 94.3 |
| 1-Ethoxy-1-(2,4-dichlorophenoxy)-2,2,2-trichloroethane | 173 | 80.9 |
| 1-Ethoxy-1-(2,4,6-trichlorophenoxy)-2,2,2-trichloroethane | 201 | 86.1 |
| 1-Ethoxy-1-(2,4,5-trichlorophenoxy)-2,2,2-trichloroethane | 198 | 62.1 |
| 1-Ethoxy-1-(p-nitrophenoxy)-2,2,2-trichloroethane | 216 | 28.2 |
| 1-Butoxy-1-(p-chlorophenoxy)-2,2,2-trichloroethane | 199 | 89.4 |
| 1-Hexoxy-1-(p-chlorophenoxy)-2,2,2-trichloroethane | 211 | 97.6 |
| 1-Octoxy-1-(p-chlorophenoxy)-2,2,2-trichloroethane | 153 | 92.8 |
| 1-$\beta$-chloroethoxy-1-phenoxy-2,2,2-trichloroethane | 224 | 63.8 |
| 1-$\beta$-chloroethoxy-1-(p-chlorophenoxy)-2,2,2-trichloroethane | 185 | 86.5 |
| 1-$\beta$-chloroethoxy-1-(2,4-dichlorophenoxy)-2,2,2-trichloroethane | 166 | 83.1 |
| 1-$\beta$-chloroethoxy-1-(2-naphthoxy)-2,2,2-trichloroethane | 201 | 84.6 |
| 1-Ethoxy-1-(p-methylphenoxy)-2,2,2-trichloroethane | 133 | 86.5 |
| 1-Ethoxy-1-(p-ethoxyphenoxy)-2,2,2-trichloroethane | 186 | 91.4 |

Example C

Pinto bean leaves infested with red spider mites (Tetranychus telarius) were sprayed with 1% emulsions of various mixed aliphatic-aromatic acetals of chloral, the emulsions containing a small amount of wetting agent known to be non-toxic to the organisms under test. There were variable numbers of mites in four replicates of each treatment. Observations were made after 24 hours to disclose the kill of mites. The percent mortality and number of mites on the leaves treated with the various mixed aliphatic-aromatic acetals of chloral are shown in the table below. In untreated (check) leaves infested with 288 red spider mites, the mortality was 5.9% after 24 hours.

| Chemical | No. of Mites | Per Cent Mortality |
|---|---|---|
| 1-Ethoxy-1-phenoxy-2,2,2-trichloroethane | 241 | 100.0 |
| 1-Ethoxy-1-(p-chlorophenoxy)-2,2,2-trichloroethane | 179 | 99.4 |
| 1-Ethoxy-1-(o-chlorophenoxy)-2,2,2-trichloroethane | 189 | 100.0 |
| 1-Ethoxy-1-(m-chlorophenoxy)-2,2,2-trichloroethane | 263 | 100.0 |
| 1-Ethoxy-1-(2,4-dichlorophenoxy)-2,2,2-trichloroethane | 139 | 100.0 |
| 1-Ethoxy-1-(2,4,6-trichlorophenoxy)-2,2,2-trichloroethane | 163 | 99.4 |
| 1-Ethoxy-1-(2,4,5-trichlorophenoxy)-2,2,2-trichloroethane | 148 | 80.4 |
| 1-Ethoxy-1-(p-nitrophenoxy)-2,2,2-trichloroethane | 88 | 14.8 |
| 1-Butoxy-1-(p-chlorophenoxy)-2,2,2-trichloroethane | 196 | 100.0 |
| 1-Hexoxy-1-(p-chlorophenoxy)-2,2,2-trichloroethane | 158 | 100.0 |
| 1-Octoxy-1-(p-chlorophenoxy)-2,2,2-trichloroethane | 152 | 12.3 |
| 1-β-chloroethoxy-1-phenoxy-2,2,2-trichloroethane | 253 | 96.4 |
| 1-β-chloroethoxy-1-(p-chlorophenoxy)-2,2,2-trichloroethane | 193 | 36.3 |
| 1-β-chloroethoxy-1-(2,4-dichlorophenoxy)-2,2,2-trichloroethane | 177 | 22.0 |
| 1-β-chloroethoxy-1-(2-naphthoxy)-2,2,2-trichloroethane | 191 | 81.7 |
| 1-Ethoxy-1-(p-methylphenoxy)-2,2,2-trichloroethane | 123 | 100.0 |
| 1-Ethoxy-1-(p-ethoxyphenoxy)-2,2,2-trichloroethane | 149 | 100.0 |

Having thus described our invention, what we claim and desire to protect by Letters Patent is:

1. An insecticidal composition comprising as an active ingredient a compound having the general formula

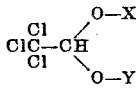

in which X is a radical selected from the group consisting of alkyl, cycloalkyl, haloalkyl, cyanoalkyl, alkoxyalkyl and hydroxyalkyl radicals having up to 12 carbon atoms and Y is a radical selected from the group consisting of phenyl, naphthyl, halophenyl, nitrophenyl, alkylphenyl, and alkoxyphenyl radicals having 6 to 10 carbon atoms, and a carrier therefor.

2. An insecticidal composition comprising as an active ingredient a 1-alkoxy-1-chlorophenoxy-2,2,2-trichloroethane in which the alkoxy group has up to 12 carbon atoms, and a carrier therefor.

3. A compound having the general formula

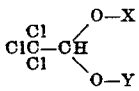

in which X is a radical selected from the group consisting of alkyl, cycloalkyl, haloalkyl, cyanoalkyl, alkoxyalkyl and hydroxyalkyl radicals having up to 12 carbon atoms and Y is a radical selected from the group consisting of phenyl, naphthyl, halophenyl, nitrophenyl, alkylphenyl, and alkoxyphenyl radicals having 6 to 10 carbon atoms.

4. A 1-alkoxy-1-aryloxy-2,2,2-trichloroethane in which the alkoxy group has up to 12 carbon atoms and the aryloxy group has 6 to 10 carbon atoms.

5. A 1-alkoxy-1-chlorophenoxy-2,2,2-trichloroethane in which the alkoxy group has up to 12 carbon atoms.

6. 1-ethoxy-1-(p-chlorophenoxy)-2,2,2-trichloroethane.

7. 1-ethoxy-1-(2,4-dichlorophenoxy)-2,2,2-trichloroethane.

8. An insecticidal composition comprising as an active ingredient a compound having the general formula

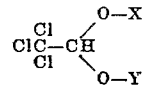

in which X is a radical selected from the group consisting of alkyl, cycloalkyl, haloalkyl, cyanoalkyl, alkoxyalkyl and hydroxyalkyl radicals having up to 12 carbon atoms and Y is a radical selected from the group consisting of phenyl, naphthyl, halophenyl, nitrophenyl, alkylphenyl, and alkoxyphenyl radicals having 6 to 10 carbon atoms, and a liquid carrier therefor.

9. An insecticidal composition comprising as an active ingredient a 1-alkoxy-1-chlorophenoxy-2,2,2-trichloroethane in which the alkoxy group has up to 12 carbon atoms, and a liquid carrier therefor.

10. An insecticidal composition comprising as an active ingredient a compound having the general formula

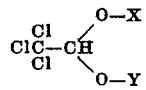

in which X is a radical selected from the group consisting of alkyl, cycloalkyl, haloalkyl, cyanoalkyl, alkoxyalkyl and hydroxyalkyl radicals having up to 12 carbon atoms and Y is a radical selected from the group consisting of phenyl, naphthyl, halophenyl, nitrophenyl, alkylphenyl, and alkoxyphenyl radicals having 6 to 10 carbon atoms, and a powdered solid carrier therefor.

11. An insecticidal composition comprising as an active ingredient a 1-alkoxy-1-chlorophenoxy-2,2,2-trichloroethane in which the alkoxy group has up to 12 carbon atoms, and a powdered solid carrier therefor.

12. An insecticidal composition comprising an aqueous emulsion of a compound having the general formula

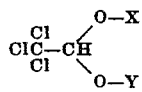

in which X is a radical selected from the group consisting of alkyl, cycloalkyl, haloalkyl, cyanoalkyl, alkoxyalkyl and hydroxyalkyl radicals having up to 12 carbon atoms and Y is a radical selected from the group consisting of phenyl, naphthyl, halophenyl, nitrophenyl, alkylphenyl, and alkoxyphenyl radicals having 6 to 10 carbon atoms, said aqueous emulsion containing a dispersing agent.

13. An insecticidal composition comprising an aqueous emulsion of a 1-alkoxy-1-chlorophenoxy-2,2,2-trichloroethane in which the alkoxy group has up to 12 carbon atoms, said aqueous emulsion containing a dispersing agent.

14. An insecticidal composition comprising 1-ethoxy-1-(p-chlorophenoxy) - 2,2,2 - trichloroethane, and a carrier therefor.

15. An insecticidal composition comprising 1-ethoxy-1-(p-chlorophenoxy) - 2,2,2 - trichloroethane, and a liquid carrier therefor.

16. An insecticidal composition comprising 1-ethoxy - 1 - (p-chlorophenoxy) -2,2,2-trichloroethane, and a powdered solid carrier therefor.

17. An insecticidal composition comprising an aqueous emulsion of 1-ethoxy-1-(p-chlorophenoxy) -2,2,2-trichloroethane, said aqueous emulsion containing a dispersing agent.

WALTER D. HARRIS.
THEODORE W. KERR.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

"Science News Letter," Mar. 22, 1947, p. 188. (Copy in Scientific Library.)

Fieser et al., "Organic Chemistry," p. 32 (1944), Heath & Co., publishers, Boston. (Copy in Div. 6.)

Oddo et al., "Gazz. Chim. Ital.," vol. 36, sec. 1, pp. 488, 489. (Copy in Scientific Library.)